Patented Aug. 31, 1954

2,687,995

UNITED STATES PATENT OFFICE 2,687,995

ELECTROLYTIC PRODUCTION OF URANIUM TETRAFLUORIDE

Eric Lofthouse, Runcorn, England, assignor to Imperial Chemical Industries Limited, a corporation of Great Britain No Drawing. Application September 21, 1944, Serial No. 555,197

Claims priority, application Great Britain October 15, 1943

6 Claims. (Cl. 204—94)

This invention relates to improvements in the production of inorganic compounds, and more particularly to electrolytic methods for the production of uranium tetrafluoride.

Uranium tetrafluoride can be prepared by adding hydrofluoric acid to an aqueous solution of a uranous salt, whereby the insoluble tetrafluoride is precipitated in hydrated form, either as $UF_4H_2O$ or $2UF_4.5H_2O$ depending on the temperature conditions during the precipitation. The uranous salt solution may be prepared by the electrolytic reduction of a solution of a soluble uranyl salt such as the sulphate or chloride, but it is necessary to maintain such a solution acid, or the required reduction does not proceed. It is also possible to reduce the uranyl salt in solution with a reducing agent such as stannous chloride or zinc in the presence of an acid. In either case, an anion other than fluoride ion is present in the solution from which the tetrafluoride is precipitated, and the tetrafluoride is thus liable to be contaminated with an impurity co-precipitated with it. This impurity is frequently difficult to remove, and for some purposes may be disadvantageous.

It is an object of the invention to provide a process for the production of uranium tetrafluoride substantially free from impurities. It is a further object of the invention to provide a process for the production of uranium tetrafluoride in a readily filterable form. Other objects will appear hereinafter.

According to the present invention a process for the production of uranium tetrafluoride comprises submitting to electrolysis an aqueous solution of uranyl fluoride containing free hydrofluoric acid. Advantageously the aqueous solution of uranyl fluoride is obtained by dissolving uranium hexafluoride in water.

In view of the need for maintaining uranyl salt solutions acid during an electrolytic reduction to the uranous condition, and the fact that hydrofluoric acid is not dissociated in aqueous solution to a very large extent, it could not be deduced from the prior art that an aqueous uranyl fluoride solution acidified with hydrofluoric acid could be efficiently reduced by an electrolytic method, particularly as uranyl fluoride itself is only ionised, in aqueous solution, to a comparatively small extent, and such ionisation must of necessity be repressed by the addition of hydrofluoric acid. Nevertheless, it has been found that on electrolysis of aqueous uranyl fluoride solutions rendered acid with hydrofluoric acid reduction does occur; the uranyl ions are reduced to uranous ions at the cathode and immediately combine with the fluoride ions in solution to form the insoluble uranium tetrafluoride which is precipitated. It is thus possible to produce uranium tetrafluoride from an aqueous solution containing no foreign ions, and a product correspondingly free from such impurities can be obtained. However, if the risk of contaminating the product with, for example, sulphate ions or chloride ions is not of importance, sulphuric acid or hydrochloric acid may be added to the solution to increase the conductivity of the solution. On the other hand, it appears that the presence of, for example, sulphuric acid, adversely affects the current efficiency in the electrolysis, and it is, therefore, preferred not to include such an acid in the electrolyte.

It is found that by appropriate selection of the temperature of the process it is possible to produce either the monohydrate, or the more highly hydrated salt $2UF_4.5H_2O$. With temperatures not above 40° C. the latter predominates, while at temperatures in excess of 60° C. the former constitutes the product. Over the range 40° C. to 60° C. the product is a mixture of both forms of the tetrafluoride. The invention is of particular value in the production of the more highly hydrated salt since it is produced under conditions which have been found to be the best, viz. the slow introduction of uranous ions into an excess of hydrofluoric acid at a temperature below 40° C. Under such conditions a crystalline precipitate is produced which can be separated easily, and thus readily freed from adherent electrolyte.

A very convenient method of obtaining an electrolyte suitable for electrolysis is to contact uranium hexafluoride with water; solution and hydrolysis of the hexafluoride results with formation of uranyl fluoride and hydrofluoric acid according to the equation:

$$UF_6 + 2H_2O \rightarrow UO_2F_2 + 4HF$$

Uranium hexafluoride can be sublimed, for example in vacuo, and thus can be obtained in a higher state of purity than many uranium salts, in particular than uranyl fluoride, and thus by dissolving in water uranium hexafluoride which has been so purified, a correspondingly purer solution of uranyl fluoride results. Moreover, the hydrofluoric acid produced by the hydrolysis will provide the necessary acidity, and will be free from the impurities, for example silico-fluorides, present in commercial aqueous hydrofluoric acid.

Solutions containing varying amounts of the uranyl fluoride may be electrolysed, but it has been found convenient to employ solutions containing at least 2.4 gram mols of the uranyl fluoride per litre, and suitably between 2.4 and 6.0 gram mols per litre. The uranyl fluoride electrolyte may also be obtained by dissolving in water uranyl fluoride produced by other methods and adding hydrofluoric acid to the solution. The amount of acid so added should be at least that corresponding to 2 gram mols of HF per gram mol of uranyl fluoride, and is advantageously an amount approximately equal to 4 gram mols of HF per gram mol of uranyl fluoride, though greater or smaller proportions may be employed.

The electrolytic reduction may be carried out in a cell without a diaphragm, fitted with a stirrer, with means for regulating the temperature of the electrolyte, and with inert electrodes. The anode, for example, may be of any metal not attacked by the electrolyte under the conditions of electrolysis. Conveniently it is made of platinum, which may be in the form of a wire net or a sheet; alternatively platinum tubing may be used, and this may be provided with means for circulating cooling liquid through it. It is advantageous to use as the cathode a metal or alloy which is liquid at the temperature of electrolysis, since with a liquid cathode a cathode/electrolyte interface is obtained from which the precipitated uranium tetrafluoride can readily be removed by keeping the electrolyte stirred, and the efficiency of the process thus maintained. With a solid cathode a layer of product, which is not removed by stirring the electrolyte, tends to form on its surface and the current efficiency is then greatly reduced. However, a solid cathode may be used in conjunction with scraping or rubbing devices to prevent the formation of a layer of uranium tetrafluoride on its surface. A suitable liquid cathode which may be employed is mercury, and when the electrolysis is carried out at a suitable elevated temperature Wood's metal or a similar alloy can be used. With a liquid cathode it will be arranged that this forms a layer on the bottom of the cell, while the anode is arranged parallel to it, and a short distance above it. The stirring device may be between the two, or it may be above the anode.

In carrying out the process the cell is charged with the electrolyte, for example a solution obtained by dissolving 1 to 1.5 parts by weight of uranium hexafluoride in 10 parts of water, whereby a solution is obtained containing suitable concentrations of uranyl fluoride and of hydrofluoric acid. A current is then passed through the cell at a suitable voltage so that reduction of uranyl fluoride occurs at the cathode. The stirrer is operated so that the uranium tetrafluoride precipitated is moved from the cathode where it is formed and kept in suspension in the electrolyte. As electrolysis proceeds the potential difference between the electrodes increases due to the alteration in the composition of the electrolyte and thus in its resistance. Thus, while, for example, the cell voltage may initially be 6.8 volts, when reduction is complete the voltage will have risen to about 12.2 volts; the exact values will depend on the current density, and such factors as the spacing and shape of the electrodes. The increase in voltage thus forms a ready method of following the course of reduction, attainment of a steady value giving a suitable indication that the reduction is complete. During the course of the electrolysis heat is evolved and the temperature of the cell will rise, but by the use of cooling means it can be maintained at any desired value. A very suitable temperature is 30° C. to 35° C., since at that temperature electrolysis proceeds at a satisfactory current efficiency and the uranium tetrafluoride is precipitated in a well defined crystal form which can be readily filtered and washed. The cathodic current density which gives satisfactory results is not critical, but is preferably not more than 0.1 amp./sq. cm., and is conveniently between 0.03 and 0.05 amp./sq. cm.

When the reduction is complete, as indicated by the attainment of a steady cell voltage, the supply of electricity is stopped and the suspension of hydrated uranium tetrafluoride is then diverted to a settling tank, where the tetrafluoride is allowed to settle out. The clear liquid is then decanted, and the solid washed with water and dried. If desired, the drying may be carried out so as to leave the hydrate undecomposed, or it may be dried at such a temperature that the water of hydration is expelled, leaving the anhydrous salt.

I claim:

1. A process for the production of uranium tetrafluoride which comprises submitting to electrolysis an aqueous solution in which the solute comprises substantially uranyl fluoride, said solution being acidified with at least 2 gram mols. of hydrofluoric acid per gram mol. of uranyl fluoride.

2. A process according to claim 1 in which the said aqueous solution contains between 2.5 and 6.0 gram mols of uranyl fluoride per litre.

3. A process for the production of uranium tetrafluoride which comprises submitting to electrolysis an aqueous solution in which the solute comprises substantially uranyl fluoride, said solution being acidified with approximately 4 gram mols. of hydrofluoric acid per gram mol. of uranyl fluoride.

4. A process according to claim 3 in which the said aqueous solution contains between 2.5 and 6.0 gram mols of uranyl fluoride per litre.

5. A process for the production of uranium tetrafluoride which comprises dissolving uranium hexafluoride in water and submitting the resultant acid aqueous solution of uranyl fluoride to electrolysis.

6. A process for the production of uranium tetrafluoride which comprises dissolving uranium hexafluoride in water so as to produce a solution of uranyl fluoride containing between 2.5 and 6.0 gram mols of uranyl fluoride per litre and between 10 and 24 gram mols of hydrofluoric acid per litre, and submitting the resultant solution to electrolysis.

References Cited in the file of this patent

UNITED STATES PATENTS

| Number | Name | Date |
|---|---|---|
| 723,217 | Spence | Mar. 17, 1903 |
| 1,369,204 | Taylor | Feb. 22, 1921 |
| 1,448,036 | Pearson et al. | Mar. 13, 1923 |

OTHER REFERENCES

Chemical Abstracts, vol. 31, page 2115 (1937), an abstract of an article in J. Gen. Chem. (U. S. S. R.) 6, 1701–14 (1936).

Mellor, "A Comprehensive Treatise on Inorganic and Theoretical Chemistry," vol. 12, pages 25, 26, 74, 75, 76 and 80, Longman's, Green and Co., New York (1932).

Pierle, Journal of Physical Chemistry, vol. 23, pp. 527–531 (1919).

De Ment and Dake, "Uranium and Atomic Power," pages 109 and 121, Chemical Publishing Co., Brooklyn, N. Y. (1941).